United States Patent [19]

Mintgen et al.

[11] Patent Number: 5,126,925

[45] Date of Patent: Jun. 30, 1992

[54] CONSTRUCTION ASSEMBLY INCLUDING A TELESCOPIC STRUT

[75] Inventors: Rolf Mintgen, Thur; Castor Fuhrmann, Brachtendorf; Gregor Poertzgen, Koblenz; Michael Schuth, Hahn am See, all of Fed. Rep. of Germany

[73] Assignee: Stabilus GmbH, Koblenz-Neuendorf, Fed. Rep. of Germany

[21] Appl. No.: 562,723

[22] Filed: Aug. 6, 1990

[30] Foreign Application Priority Data

Aug. 17, 1989 [DE] Fed. Rep. of Germany ....... 3927147
Aug. 17, 1989 [DE] Fed. Rep. of Germany ....... 3927149

[51] Int. Cl.⁵ .................................................. B60Q 3/06
[52] U.S. Cl. ........................................ 362/80; 362/83.3; 362/154; 362/155; 296/106
[58] Field of Search .............. 362/61, 83.3, 154, 384, 362/253, 155, 156, 80; 296/106

[56] References Cited

U.S. PATENT DOCUMENTS

| | | | |
|---|---|---|---|
| 2,929,528 | 3/1960 | Hoag et al. | 296/106 |
| 3,213,419 | 10/1965 | Stults | 362/61 |
| 3,691,366 | 9/1972 | Spreuer | 362/253 |
| 3,943,351 | 3/1976 | Nilsson | 362/80 |
| 4,054,789 | 10/1977 | Romanelli | 362/80 |
| 4,163,970 | 8/1979 | Allinquant | 340/686 |
| 4,270,787 | 6/1981 | Savell | 362/82 |
| 4,281,884 | 8/1981 | Freitag et al. | 200/61.62 |

FOREIGN PATENT DOCUMENTS

| | | |
|---|---|---|
| 7736254 | 6/1981 | Fed. Rep. of Germany . |
| 0047617 | 2/1989 | Japan ............... 362/106 |

*Primary Examiner*—Ira S. Lazarus
*Attorney, Agent, or Firm*—Brumbaugh, Graves, Donohue & Raymond

[57] ABSTRACT

According to an illustrative example of the invention, a motor vehicle comprises a basic frame. A compartment is defined within this basic frame. This compartment is intended for receiving an engine or for receiving luggage. The compartment is provided with a lid which is pivotable about a horizontal axis. For facilitating opening and closing of the lid, a gas spring is in operative connection between the basic frame and the lid. A light source is provided for illuminating the compartment when opened. This light source is mounted on the gas spring.

34 Claims, 5 Drawing Sheets

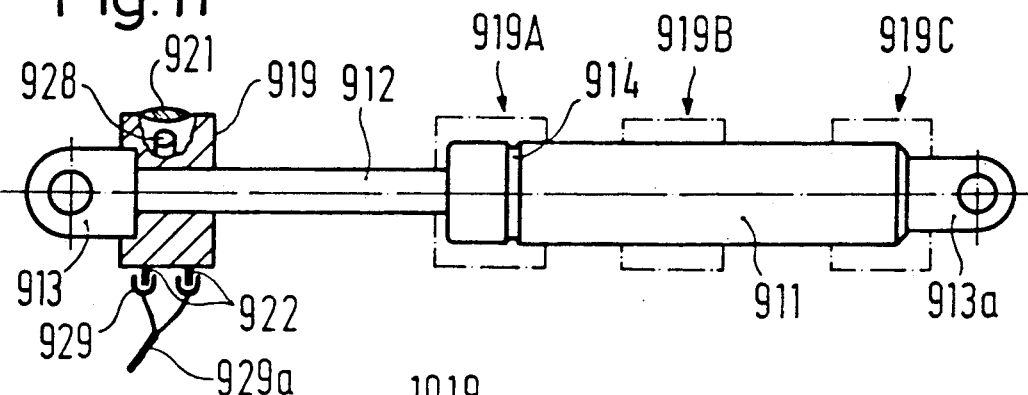
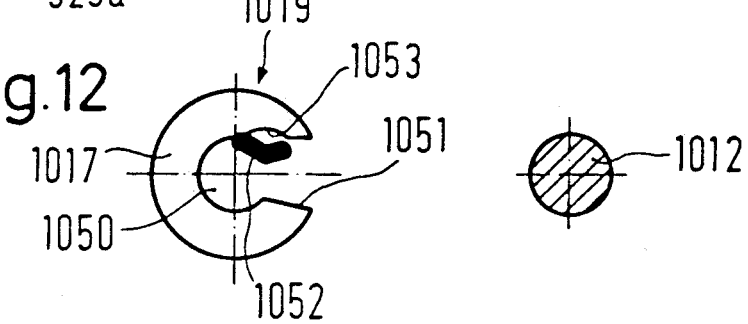
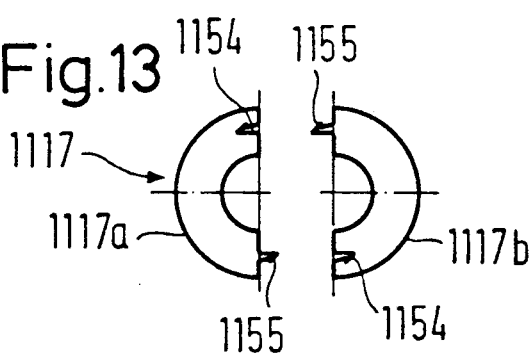
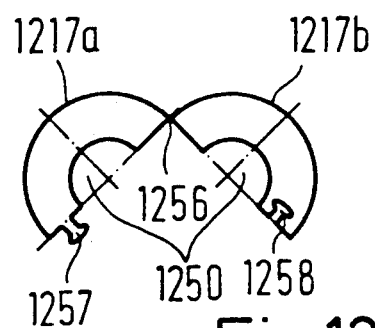
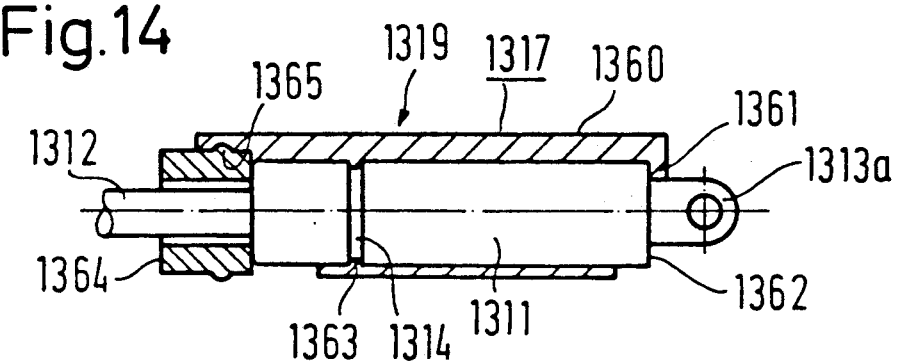

CONSTRUCTION ASSEMBLY INCLUDING A TELESCOPIC STRUT

BACKGROUND OF THE INVENTION

In motor vehicles and other mechanical constructions, there are frequently provided compartments which can be closed by a lid. E.g., the motor compartment can be closed by a hood or a luggage compartment can be closed by a lid. These lids are frequently pivotable about a horizontal axis and are subject to gravity forces when being closed and opened. For facilitating opening and closing, a gas spring may be connected to the basic frame and to the lid. In other cases, a telescopic strut is provided between the basic frame and the respective lid. This telescopic strut, which may also be a gas spring, can be used for maintaining the respective lid in an opened position.

Further, there is frequently a necessity of providing a light source for illuminating the respective compartment. Such illumination is necessary in case of engine compartments to facilitate repair works. In case of luggage compartments, such a light source is helpful for placing and removing luggage parts in and from the compartments, respectively.

STATEMENT OF THE PRIOR ART

From German Utility Model 77 36 254 it is known to use a gas spring as an operational part of a light source installation for a hood or a luggage compartment. According to this German utility model, a switch for a light source illuminating such a compartment is integrated into a gas spring such that the light source is switched on and switched off in response to extension and retraction of the gas spring which again occurs in response to opening and closing of the respective lid.

OBJECT OF THE INVENTION

It is frequently difficult to locate a light source for such a compartment such that it provides a good illumination of the respective compartment on the one hand, does not require valuable space within the respective compartment on the other hand and is also protected against mechanical contact and destruction by such mechanical contact.

It is therefore an object of the present invention to position a light source such that it provides good illumination of the respective compartment, does not interfere with operations to be made within the respective compartment by the user and is protected against mechanical contact. A further object is to save costs and cable length.

SUMMARY OF THE INVENTION

In consideration of at least part of the above objects, a construction assembly comprises a basic frame unit and a frame member movably mounted on the basic frame unit. At least one telescopic strut unit includes at least two telescopic members and is connected to both said basic frame unit and said movable frame member. A lighting installation with at least one light source unit is provided. This light source unit is carried by the telescopic strut unit.

The movable frame member may be pivotally mounted in the basic frame unit about a substantially horizontal axis and may be subject to gravity forces. In such case, the telescopic strut unit can assist movement of the movable frame member about the substantially horizontal axis against said gravity forces. Alternatively and/or additionally, said telescopic strut unit may be used for supporting said movable frame member in at least one position thereof against said gravity forces.

The movable frame member may be a closure member for closing a compartment confined within the basic frame unit. In this case, the light source unit may be intended for illuminating the compartment.

The telescopic strut is e. g. in a motor vehicle located such that it does not interfere with operations to be performed within the respective compartment and is further located such that it is not contacted by the user when performing operations within the respective compartment. Therefore, the telescopic strut is very well adapted as a carrier for a light source unit which is subject to similar requirements.

The light source unit may be located such on the telescopic strut unit that it illuminates the respective compartment.

The light source unit may be movably mounted on the telescopic strut such that the direction of light emission of the light source unit is voluntarily variable. Such, it is possible to illuminate various zones of the respective compartment according to need.

The light source unit may be powered by a cable system laid within the basic frame unit. This cable system should be laid such that the cable sections are as short as possible and are not subject to mechanical contact, when the user performs operations within the respective basic frame unit.

According to a preferred embodiment, the telescopic strut unit includes a first telescopic member connected to the basic frame unit and a second telescopic member connected to the movable frame member. In such case, it is preferred to provide the light source unit on the first telescopic member, because this allows the shortest possible way for the cable. More particularly, it is not necessary to provide a cable which is subject to considerable movements, when the movable frame member is moved with respect to the basic frame unit.

The light source unit may be preassembled with the telescopic strut unit before connecting the strut unit to the basic frame unit and the movable frame member. Alternatively, the light source unit may be attachable to the telescopic strut unit, when said telescopic strut unit is connected to the basic frame unit and/or to the movable frame member. This allows to provide the light source unit, after the respective construction assembly has been completed in the manufacturing plant and the construction is already in use.

When it is desired to vary the direction of light emission, the light source unit may comprise a mounting portion for being mounted on the telescopic strut unit and a light emitting portion movable with respect to the mounting portion. More particularly, it is preferred to have a light emitting portion which is rotatable with respect to the mounting portion.

When the telescopic strut unit has a longitudinal axis, the light emitting portion may e g. be rotatable relative to the mounting portion about the longitudinal axis of the telescopic strut unit.

The light source unit may comprise an electric bulb and a light-permeable covering element for protecting the bulb. Moreover, the light source unit may be combined with a switch.

The switch may be manually operable; preferably, however, the switch is operable in response to relative movement of the movable frame member with respect to the basic frame unit.

If the movable frame member is a closure member for a compartment within the basic frame unit, e. g. a trunk lid or a hood of a motor vehicle, the switch member may be operable in response to movement of the cover member such that the light source unit is switched off, when the cover member is in a closing position and is switched on, when the cover member is in an opening position with respect to the compartment.

The telescopic strut unit is frequently provided with at least one connection member at one of its ends for providing connection with the basic frame unit or with the movable frame member. Such connection members are frequently formed of plastic material and can be shaped such that they accommodate the light source unit. The light source unit may e. g. be housed within a cavity of the connection member and may be fastened to the connection member by snap fastening means.

Alternatively, the light source unit may be also mounted or adapted for being mounted on one of the telescopic members themselves. Taking into consideration that the telescopic members are frequently elongate components, the light source unit may be provided with passage means defining a passage therethrough. This passage means may accommodate the respective telescopic part passing therethrough. The passage means in such case may be dimensioned such as to frictionally engage the respective telescopic member.

According to a first alternative, the passage means may comprise a radial slot permitting radial entrance of the respective telescopic member into said passage. This embodiment is particularly useful, when the light source unit is to be mounted after the strut unit has been installed within the construction assembly. In this case, the passage means may be such as to elastically engage the respective telescopic member.

The passage means may alternatively also comprise two passage confining members. These passage confining members may be connectable with each other by at least two pairs of connecting means located substantially diametrically with respect to each other. Both pairs of connecting means may be snap connecting means. It is, however, also possible that one pair of connecting means is a hingemeans.

According to a further alternative, the passage means comprise a first sleeve member surrounding one of the telescopic members. This first sleeve member is provided with an abutment member adjacent one end thereof. Said abutment member is engageable with an abutment face of the respective telescopic member. Said first sleeve member is further provided with engagement means for engagement with a second sleeve member. This second sleeve member may be engageable with a further abutment face of the telescopic member. In such embodiment, the electric bulb may be provided on both sleeve members. Preferably, it is provided, however, on the second sleeve member.

If the telescopic strut unit comprises a cylinder member and a piston rod member axially extending through at least one end of the cylinder member, the light source unit may be positioned such as to surround the piston rod member adjacent said one end of the cylinder member, and the light source unit may be fixed with respect to said one end of the cylinder member.

Frequently, the cylinder member is provided with a radially inwardly crimped terminal portion adjacent said one end thereof. This crimped terminal portion is used for fastening a guiding and sealing unit through which the piston rod member passes. This crimped terminal portion may be used also for mounting the light source unit on the cylinder member, e. g. by snapping engagement.

The cylinder member is also frequently shaped with a circumferential external recess adjacent the end thereof, through which the piston rod passes. This recess is again useful for fixing a piston rod guiding and sealing member and may be additionally used for fastening the light source unit. E.g., the light source unit may be provided with one or several snapping arms which have snapping projections adjacent their free ends and engage with such snapping projections into the circumferential recess.

At least one of the telescopic members may be electrically conductive. This is well known per se, e.g. from U.S. Pat. No. 4,281,884. Such, the gas spring may be used for conducting electric power and may be either at the potential of the basic frame unit or at a higher potential. In this case, the telescopic strut may be used for power supply to the respective electric bulb.

According to a preferred embodiment of the invention, the telescopic strut comprises a gas spring.

If a switch is to be provided, this switch may be integrated into the light source unit. Preferably, the switch may be mounted on one of the telescopic members, and a switch operating member may be provided on the other one of the telescopic members. As the telescopic members are movable with respect to each other, in response to movement of the frame member with respect to the basic frame unit, such movement of the frame member can automatically switch on and switch off the light source unit.

The various features of novelty which characterize the invention are pointed out with particularity in the claims annexed to and forming a part of the disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be explained in greater detail hereafter with reference to embodiments shown in the accompanying drawings in which

FIG. 11 shows a gas spring according to FIG. 1 with a light source unit in a plurality of locations on the piston rod and the cylinder;

FIG. 12 shows an end view of a mounting portion of the light source unit of FIG. 11 according to a first embodiment with the piston rod in cross-section;

FIG. 13 shows an end view of a second embodiment of the mounting portion;

FIG. 13a shows an end view of a third embodiment of the mounting portion;

FIG. 14 shows a longitudinal section through a gas spring with a mounting sleeve for a light source unit fastened on the cylinder member and FIG. 15 shows a rearward part of a motor vehicle with a trunk lid supported by a gas spring and a light source unit fastened to the gas spring.

DETAILED DESCRIPTION OF THE PREFERRED EMBODIMENTS

Figure 1:
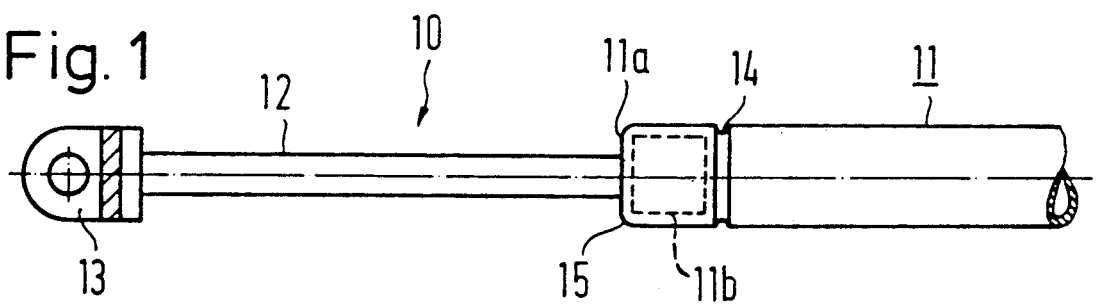
FIG. 1 shows a side view of a gas spring.

The gas spring 10 shown in FIG. 1 comprises a cylinder member 11 and a piston rod member 12 extending inwards and outwards in axial direction through an end 11a of the cylinder member 11. The piston rod member 12 is provided adjacent its outer end portion with a connection member 13 to be connected with a complementary connection member provided on the basic frame of a motor vehicle or on a cover member, such as a trunk lid or a hood. The piston rod is guided through a sealing and guiding unit 11b which is axially fixed by a radially inwardly directed circumferentially extending depression 14 of the cylinder member 11 and by a radially inwardly crimped terminal flange 15.

Figure 2:
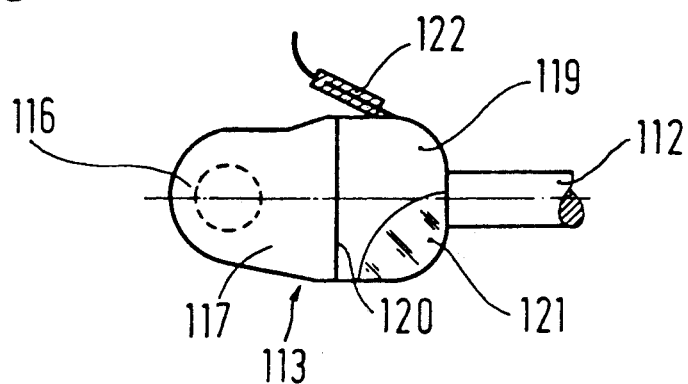
FIG. 2 shows the piston rod of a gas spring according to FIG. 1 with a connection member including a light source unit.

According to FIG. 2, a connection member 113 ist fastened to the outer end of the piston rod member 112. This connection member 113 is composed by a mounting portion 117 and a light source unit 119. The mounting portion 117 is fixed to the piston rod member 112, and the light source unit 119 is rotatably mounted on the mounting portion 117. The separation line between the mounting portion 117 and the light source unit 119 is designated by 120. The mounting portion 117 is provided with a socket 116 adapted to be connected with a ball member on a basic frame or a cover member. The light source unit 119 comprises electrical connection means 122, a light-permeable closure member 121 and an electrical bulb below the closure member 121.

Figure 3:
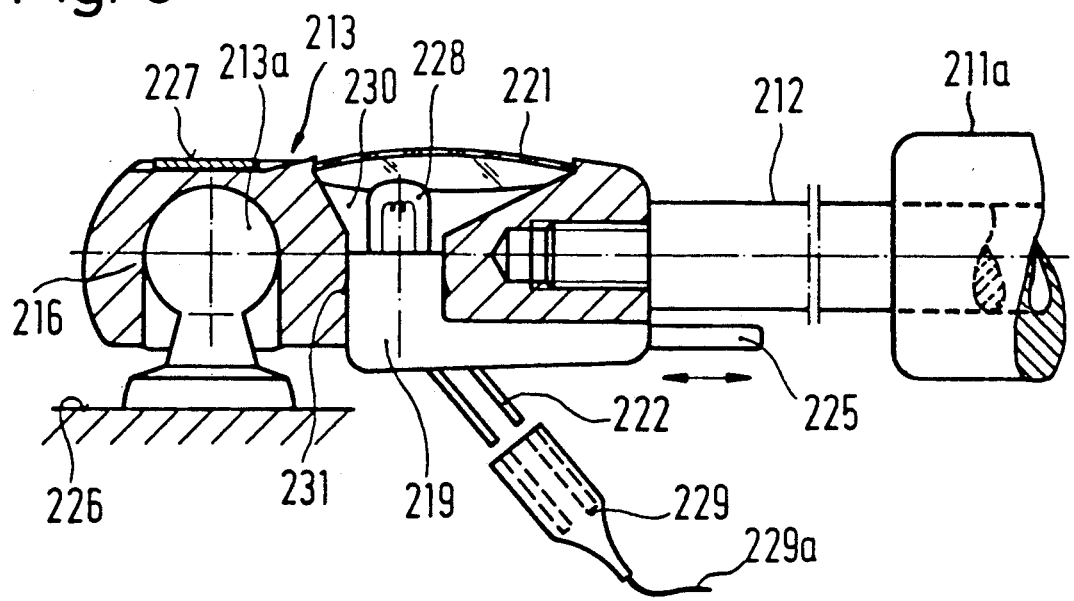
FIG. 3 shows an enlarged section through a connection member as shown in FIG. 2.

According to FIG. 3, a connection member 213 is fastened on a piston rod member 212. The connection member 213 is mounted by its socket portion 216 on a ball member 213a of the basic frame unit 226. The socket portion 216 is fastened on the ball member 213a by a clamp member 227. A cavity 230 is provided within the connection member 213 for receiving a light source unit 219. The light source unit 219 comprises a bulb 228, electrical connection means 222 and a switch 225. The switch 225 is located such as to engage the end portion 211a of the cylinder member, when the piston rod member 212 approaches its fully retracted position. A connector 229 of a cable 229a may be connected with the connection means 222. The bulb 228 is covered by a light-permeable cover member 221. The light source unit 219 is fastened to the connection member 213 by snap means 231.

Figure 4:
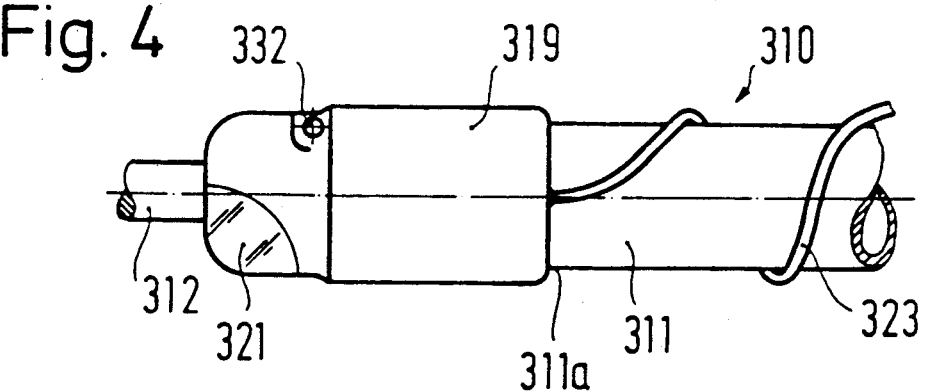
FIG. 4 shows a cylinder of a gas spring with a light source unit fixed thereto.

According to FIG. 4, a light source unit 319 is rotatably mounted on the end portion 311a of the cylinder member 311 of a gas spring 310. The light source unit 319 is provided with a light-permeable closure member 321. The piston rod member 312 extends through the light source unit 319. The light source unit 319 is fixed on the cylinder member 311 by a securing pin 332. The light source unit 319 is rotatable with respect to the cylinder member 311. An electric cable 323 is wound around the cylinder member 311 such as to allow rotation of the light source unit 319 with respect to the cylinder member 311 about the axis thereof.

Figure 5:
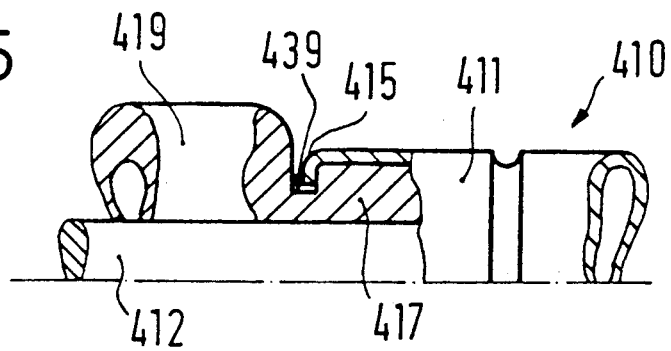
FIG. 5 shows a detail of the fastening means between a light source unit and a cylinder member of a gas spring.

According to FIG. 5, the cylinder member 411 of a gas spring 410 is provided with a radially inwardly crimped end portion 415. The light source unit 419 comprises a mounting portion 417 which is located behind the inwardly crimped end portion 415 in that this end portion 415 engages a recess 439 of the mounting portion 417. The piston rod member 412 extends through the light source unit 419.

The light source unit 419 is mounted on the cylinder member 411, when the cylinder member 411 is closed by crimping the end portion 415. The mounting portion 417 is reduced in diameter as compared with the light source unit 419. The light source unit 419 has tubular shape as shown in FIG. 5. It would be possible, however, to provide a light source unit 419 with a part cylindrical form.

Figure 6:
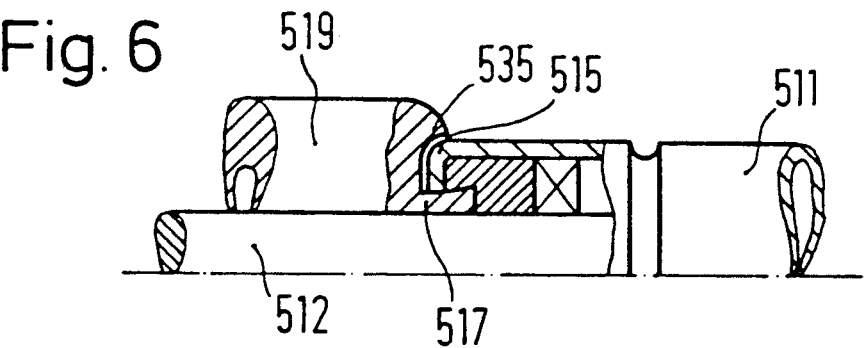
FIG. 6 shows the details of modified fastening means.

According to FIG. 6, the light source unit 519 is fastened to the cylinder member 511 by a mounting portion 517, which snappingly engages the crimped end portion 515. A recess 535 is provided within the body of the light source unit 519 such that the crimped end portion 515 can be elastically snapped into the recess 535. The piston rod member 512 again extends through the light source unit 519.

Figure 7:
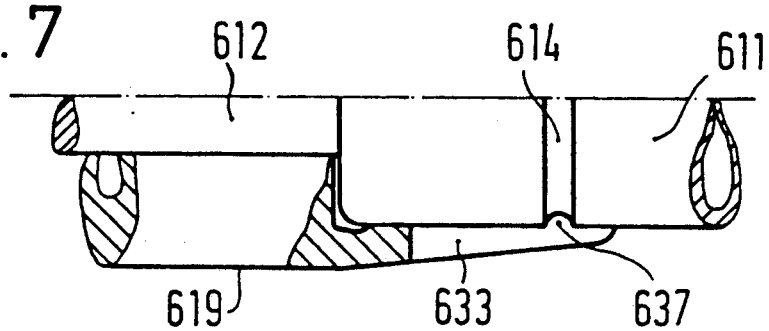
FIG. 7 shows the details of further modified fastening means.

According to FIG. 7, the light source unit 619 is provided with snapping fingers 633 which engage by snapping projections 637 into the circumferentially extending recess 614 of the cylinder member 611. The piston rod 612 extends through the light source unit 619. In this embodiment, the light source unit 619 can be mounted on the cylinder member 611, after the cylinder member 611 has been closed and before the connection member (not shown) is fastened to the piston rod member 612.

Figure 9:
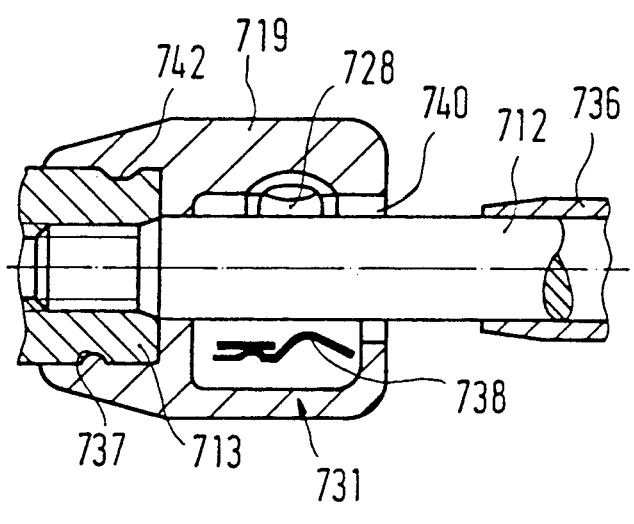
FIG. 9 shows a section according to line IX—IX of FIG. 8.
Figure 8:
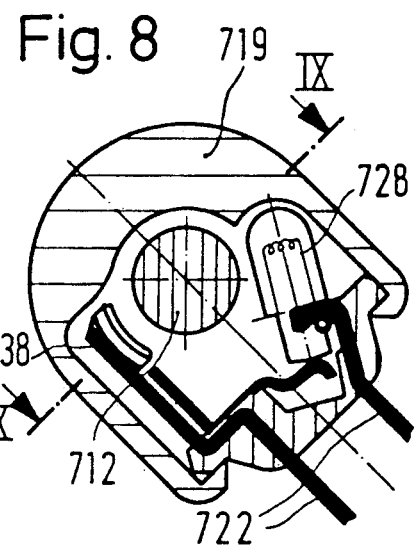
FIG. 8 shows a cross-section through a connection member of a piston rod with a light source unit and a switch integrated therein.

In the embodiment of FIGS. 8 and 9, the light source unit 719 is fastened to the connection member 713 of the piston rod member 712 by complementary fastening means 737.

The light source unit 719 comprises a partially open housing 731 in which a bulb 728 and a switch 738 are acommodated. The switch 738 is operated by a sleeve shaped switch operating member 736 which is stationary with respect to the cylinder member (not shown). The connection means 722 connects the bulb 728 and the switch 738 with an electric power source.

When the piston rod member 712 approaches its innermost position with respect to the cylinder member (not shown), the switch operating member 736 enters through an opening 740 into the housing 731 such that the switch 738 is opened.

Figure 10:
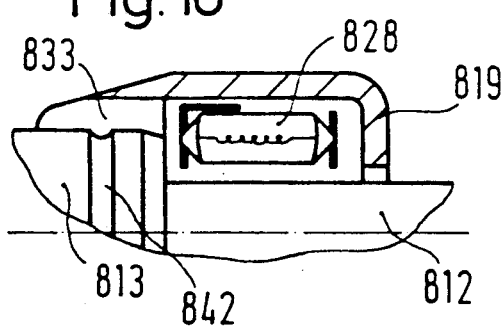
FIG. 10 shows a section through a light source unit snappingly fastened to a connection member of a piston rod.

According to FIG. 10, the light source unit 819 with the bulb 828 is fastened on the connection member 813 of the piston rod member 812 by snapping fingers 833 engaging into the recess 842 of the connection member 813.

According to FIG. 11, a light source unit 919 with a light-permeable closure member 921 and a bulb 928 is fixed on the piston rod member 912 adjacent the connection member 913. Electric connection means 922 can be connected with a cable 929a by a connector 929. As indicated in the right hand portion of FIG. 11, the light source unit 919 can be located in various locations 919A, 919B, 919C on the cylinder member 911. E.g., the light source unit 919A may be fastened on the cylinder member 911 by engagement with the circumferentially extending recess 914. The cylinder member 911 is provided with the connection member 913a for connection with the basic frame unit or the cover member.

According to FIG. 12, the light source unit 1019 comprises a mounting portion 1017, which is of substantially annular shape and defines a passage 1050 shaped such as to accommodate either the piston rod member 1012 or the cylinder member. The passage 1050 is provided with a radial slot 1051 through which the piston rod member 1012 can be introduced into the passage 1050. An elastic tongue 1052 is provided within the passage 1050 for frictional cooperation with the piston rod member 1012. The elastic tongue 1052 can be deflected into a recess 1053.

According to FIG. 13, the mounting portion 1117 of the light source unit comprises two complementary half rings 1117a and 1117b, which can be assembled by snap springs 1155 and snap recesses 1154 around a piston rod member or a cylinder member.

According to FIG. 13a, two complementary and preferably identic half rings 1217a and 1217b are connected by a hinge 1256 and can be closed by a snap spring 1257 and a snap recess 1258. The hinge 1256 may be integral with the half rings 1217a and 1217b. The half rings 1217a, 1217b define a passage 1250 which is adapted to receive a piston rod member or a cylinder member.

According to FIG. 14, the mounting portion 1317 of the light source unit 1319 comprises a first sleeve member 1360 with an abutment member 1361 abutting an end wall 1362 of the cylinder member 1311 adjacent the connection member 1313a. The first sleeve member 1360 is provided with radially inwardly directed projections 1363 which engage in a circumferentially extending recess 1314 of the cylinder member 1311. A second sleeve member 1364 is engageable with the sleeve member 1360 by snap means 1365. The bulb may be provided in both the first sleeve member 1360 and the second sleeve member 1364. The piston rod member 1312 extends through the second sleeve member 1364.

It is well possible that at least one of the cylinder member 11 and the piston rod member 12 is electrically conductive and is connected with one of the poles of a motor vehicle current source. In this case, one pole of the electrical bulb may be connected with the electrically conductive piston rod member or cylinder member. In case of a motor vehicle, the cylinder member or piston rod member may be connected with the basic frame unit of the motor vehicle, which may be metallic and may be in connection with one pole of the motor vehicle current source. In this case, it is only necessary to provide a cable from the other pole of the motor vehicle current source to the other pole of the bulb and a switch may be provided in this cable. It is, however, also possible to isolate the gas spring from the basic construction unit and the cover member and to use the gas spring as a current bridge between cable sections which lead from the motor vehicle current source to the electric bulb and which are on a potential different from the potential of the basic construction unit.

Figure 15:
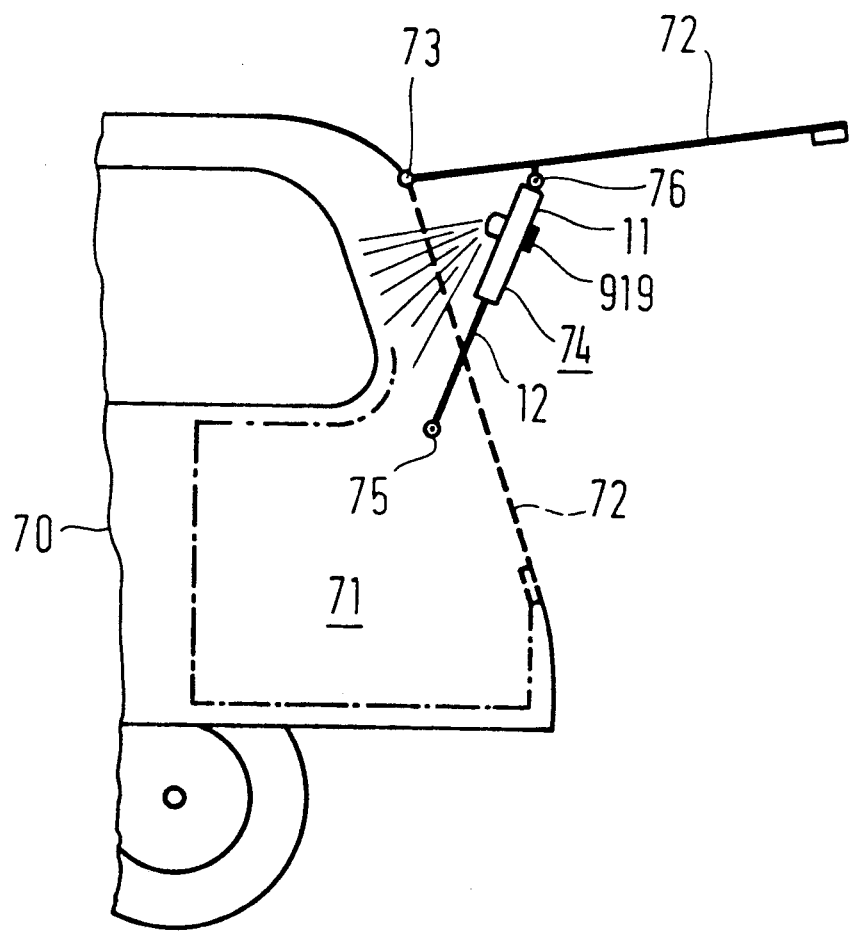

In FIG. 15, the rearward part of a motor vehicle is designated by 70. A luggage compartment 71 is provided within the motor vehicle. This luggage compartment is provided with a cover member or trunk lid 72 which is shown in its open position in full line. The trunk lid 72 can be pivoted about a horizontal axis 73 into the closed position shown in dashed line. A telescopic strut unit 74, e.g. a gas spring as shown in FIG. 1, is connected at 75 with the motor vehicle and at 76 with the cover member. A light source unit 919 is mounted on the gas spring. The gas spring assists opening of the cover member or trunk lid 72 and maintains it in the open position.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

We claim:

1. A construction assembly comprising:
   a basic frame unit (70) defining a compartment (71) therein;
   a frame member (72) pivotally mounted on said basic frame unit (70) about a substantially horizontal axis, such that the pivotally mounted frame member serves as a closure member for closing the compartment (71) and is movable against the force of gravity to open the compartment (71);
   at least one telescopic strut unit (74) including at least two telescopic members (11,12), one of said telescopic members (11,12) being connected to said basic frame unit (70) and the other being connected to said pivotally mounted frame member (72), said telescoping strut unit (74) producing a force opposing the force of gravity acting on the pivotally mounted frame member (72); and
   a lighting installation with at least one light source unit (119;919) carried by said at least one telescopic strut unit (74) for illuminating said compartment (71).

2. A construction assembly as set forth in claim 1, said light source unit (119;919) being movably mounted on said telescopic strut unit (74) such that the direction of light emission of said light source unit (119;919) is voluntarily variable.

3. A construction assembly as set forth in claim 1, said light source unit (219) being powered by a cable system laid within said basic frame unit (70).

4. A construction assembly as set forth in claim 1, said telescopic strut unit (74) including a first telescopic member (12) connected to said basic frame unit (70) and a second telescopic member (11) connected to said movable frame member (72), said light source unit (119) being carried by said first telescopic member (12).

5. A construction assembly as set forth in claim 1, said light source unit (119) being preassembled with said telescopic strut unit (74) before connecting said strut unit (74) to said basic frame unit (70) and said movable frame member (72).

6. A construction assembly as set forth in claim 1, said light source unit (919) being attachable to said telescopic strut unit (74), when said telescopic strut unit (74) is connected to at least one of said basic frame unit (70) and said movable frame member (72).

7. A construction assembly as set forth in claim 1, said light source unit (119) comprising a mountingportion (117) for being mounted on said telescopic strut unit (74) and a light emitting portion (119) movable and more particularly rotatable with respect to said mounting portion (117).

8. A construction assembly as set forth in claim 7, said telescopic strut unit (74) having a longitudinal axis, said light emitting portion (119) being rotatable relative to said mounting portion (117) about said longitudinal axis.

9. A construction assembly as set forth in claim 1, said light source unit (219) comprising an electric bulb (228) and a light-permeable covering element (221).

10. A construction assembly as set forth in claim 1, said light source unit (219) being combined with a switch (225).

11. A construction assembly as set forth in claim 10, said switch (225) being operable in response to relative movement of said movable frame member (72) with respect to said basic frame unit (70).

12. A construction assembly as set forth in claim 1, said movable frame member (72) being a closure member for a compartment (71) confined within said basic frame unit (70), said light source unit (219) being combined with a switch (225), said switch (225) being operable in response to movement of said closure member (72) with respect to said compartment (71), said light source unit (219) being switched off, when said cover member (72) is in a closing position, and being switched on when said cover member (72) is in an opening position with respect to said compartment (71).

13. A construction assembly as set forth in claim 1, said telescopic strut unit (74) including at least one connection member (213) for being connected to at least one of said basic frame unit (70) and said mvoeable frame member (72), said light source unit (219) being accommodated within said connection member (213).

14. A construction assembly as set forth in claim 1, said light source unit (919) being adapted for being mounted on one of said at least two telescopic members (911.912).

15. A construction assembly as set forth in claim 14, said light source unit (1019) being provided with passage means (1017) defining a passage (1050) therethrough, said passage (1050) accommodating at least one telescopic member (1012).

16. A construction assembly as set forth in claim 15, said passage means (1017) being dimensioned such as to frictionally engage at least one telescopic member (1012).

17. A construction assembly as set forth in claim 15, said passage means (1017) comprising a radial slot (1051) permitting radial entrance of the respective telescopic member (1012) into said passage (1050).

18. A construction assembly as set forth in claim 17, said passage means (1017) elastically engaging the respective telescopic member (1012).

19. A construction assembly as set forth in claim 15, said passage means (1117) comprising two passage confining members (1117a, 1117b).

20. A construction assembly as set forth in claim 19, said passage confining members (1117a, 1117b) being connectable with each other by at least two pairs of connecting means.

21. A construction assembly as set forth in claim 20, a first one (1256) of said pairs of connecting means (1256; 1257.1258) being hinge means (1256), a second one of said pairs of connecting means being snap connecting means (1257, 1258).

22. A construction assembly as set forth in claim 20, at least two diametrically opposed pairs of connecting means (1154,1155) being snap connecting means.

23. A construction assembly as set forth in claim 15, said passage means comprising a first sleeve member (1360) surrounding one (1311) of said telescopic members (1311,1312), said first sleeve member (1360) being provided with an abutment member (1361) adjacent one end thereof, said abutment member (1361) being engageable with an abutment face (1362) of the respective telescopic member (1311), said first sleeve member (1360) being further provided with engagement means (1365) for engagement with a second sleeve member (1364).

24. A construction assembly as set forth in claim 1, said telescopic strut unit (74) comprising a cylinder member (311) having an axis and a piston rod member (312) axially extending through at least one end of said cylinder member (311), said light source unit (319) surrounding said piston rod member (312) adjacent said one end of said cylinder member (311), said light source unit (319) being fastened with respect to said one end of said cylinder member (311).

25. A construction assembly as set forth in claim 24, said cylinder member (411) being provided with a radially inwardly crimped terminal portion (415) adjacent said one end thereof, said light source unit (419) being in engagement with said radially inwardly crimped terminal portion (415).

26. A construction assembly as set forth in claim 25, said light source unit (519) being in snapping engagement with said radially inwardly crimped terminal portion (515).

27. A construction assembly as set forth in claim 24, said cylinder member (611) being provided with a circumferential external recess (614) adjacent said one end thereof, said light source unit (619) being in engagement with said circumferential recess (614).

28. A construction assembly as set forth in claim 27, said light source unit (619) being provided with at least one snapping arm (633), said snapping arm (633) being provided with a snapping projection (637) engageable with said circumferential external recess (614).

29. A construction assembly as set forth in claim 1, at least one of said telescopic members (11,12) being electrically conductive, said light source unit being connected to a power supply through said at least one electrically conductive telescopic member.

30. A construction assembly as set forth in claim 1, said telescopic strut unit (74) being a gas spring (10) comprising a cylinder member (11) having an axis and a piston rod member (12) extending through at least one end (11a) of said cylinder member (11), a cavity being defined within said cylinder member (11), a volume of pressurized gas being confined within said cavity, said pressurized gas exerting an axial biasing force onto said piston rod member (12).

31. A construction assembly as set forth in claim 10, said switch (225) being integrated into said light source unit (219).

32. A construction assembly as set forth in claim 31, said switch (738) being mounted on one (712) of said telescopic members, a switch operating member (736) being mounted on the other one of said telescopic members, said telescopic members being telescopically movable with respect to each other.

33. A construction assembly as set forth in claim 1, said basic frame unit (70) being a basic frame unit of a motor vehicle, said movable frame member (72) being a cover member for a compartment (71) within said motor vehicle.

34. A construction assembly according to claim 13, further comprising snap means (231) for fastening said light source unit (219) to said connection member (213).

* * * * *